Patented June 21, 1932

1,864,067

UNITED STATES PATENT OFFICE

LOUIS H. HOWLAND, OF PASSAIC, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing.   Application filed March 6, 1930.   Serial No. 433,811.

This invention relates to a method of retarding the deterioration of rubber and similar vulcanizable materials, particularly to the treatment of the same with the condensation products of aromatic aldehydes and amino phenols. The invention also relates to the products of such treatment.

An object of this invention is to provide an effective antioxidant of the class stated. Another object is to provide a process for improving the ageing of rubber.

Accordingly the invention comprises treating rubber with the product obtained by the reaction of an aromatic aldehyde having the general formula R—CHO with an amino phenol having the general formula $$H_2N—R'—OH,$$

in which R may be any aromatic radical and R' is any arylene radical. The products obtained are believed to have the general formula

in which R and R' are as above stated.

Exemplary of the aldehydes are such as benzaldehyde, salicyl aldehyde, para-hydroxy benzaldehyde, and 2-naphthol-1-aldehyde. Aminophenols are such as ortho-aminophenol, meta-aminophenol, para-aminophenol, alpha-amino-beta-naphthol, aminocresols such as 2-amino-5-cresol and 5-amino-2-cresol.

The product obtained from the reaction of benzaldehyde and para-amino-phenol is known as benzal-para-amino phenol. The other members of the class are named in an analogous manner.

The following embodiments are illustrative of the invention and are not to be construed as limiting thereof:

A mixture of one mole of para-amino-phenol and one mole of benzaldehyde is heated for several hours at 100° C. The mixture is stirred occasionally. After the heating is completed, the material is dissolved in hot alcohol and poured into the water. The product is then filtered, washed thoroughly and dried in an oven at 100° C. The crude product is a light fine powder with a slight purplish tint. The product as prepared is ready for use in rubber. This product and the other members of the class may be made by any of the methods described in the literature.

My preferred method of carrying out the invention is as follows:

1.5 parts of benzal para-amino phenol are incorporated in the usual manner by mixing on a rubber mill with a stock containing 100 parts of pale crepe rubber, 10 parts of zinc oxide, 3 parts of sulphur, and .3 parts of heptaldehyde aniline reaction product diluted with spindle oil.

This mix, A, is vulcanized in a mold for 30 minutes and 60 minutes at a temperature corresponding to a steam pressure of 40 pounds per square inch. A similar mix, B, is made from which the benzal para-amino phenol has been omitted. The mix is vulcanized under the same conditions. The resulting stocks are aged in the oxygen bomb for 216 hours at a pressure of 300 pounds per square inch and at a temperature of 60° C.

The tensiles obtained before and after ageing are given below:

| Green tensile | A | B |
|---|---|---|
| 30′ at 40#  | 2640 | 2785 |
| 60′ at 40#  | 3300 | 2970 |
| After ageing 216 hours in oxygen. | | |
| 30′ at 40#  | 2375 | 1440 |
| 60′ at 40#  | 2935 | Too poor to test. |

The following results have also been obtained from 5-benzal-amino-2-cresol: 0.5 part of this compound is incorporated in the usual manner of mixing on a rubber mill in a stock containing 100 parts of pale crepe rubber, 5 parts of zinc oxide, 50 parts of whiting, 50 parts of red oxide, 0.75 parts diphenyl guanidine and 3 parts of sulphur. This mix, C, is vulcanized in a mold for 30 minutes and 45 minutes at a temperature corresponding to a steam pressure of 40 pounds per square inch. A similar mix, D, is made from which the 5-benzal-amino-2-cresol has been omitted. This mix is vulcanized under the same conditions. The resulting stocks are aged in the oxygen bomb for 48 hours at a pressure of 300 pounds per square inch and at a temperature of 60° C. The tensiles obtained before and after ageing are given below:

| Green tensile | C | D |
|---|---|---|
| 30′ at 40# | 2345 | 2165 |
| 45′ at 40# | 2270 | 2310 |
| Aged 48 hours in oxygen | | |
| 30′ at 40# | 1840 | Too poor to test |
| 45′ at 40# | 1850 | Too poor to test |

The salicyl aldehyde derivative of para amino phenol (ortho-hydroxy benzal para-amino phenol) has also proved to be an antioxidant.

The term "rubber" is to include gutta percha, balata and other rubber-like materials. The term "an amino phenol" in the claims is to be construed as meaning any aromatic amine which contains at least one hydroxyl group attached to an aromatic nucleus.

These chemicals may be added to rubber by any of the methods known to the art, for example, they may be added to the rubber mix on the mill or they may be applied to the rubber after vulcanization by dipping, painting, spraying, or in other ways. Or they may be mixed with rubber latex or dissolved in a suitable solvent and added to the latex in this way.

The use of this class of chemicals for retarding the deterioration of rubber is, of course, not limited to the types of stocks described in the examples given. Any of the usual ingredients of a rubber mix may be varied at will and any other accelerators than these mentioned in the example given may be used.

The chemicals disclosed may be used to retard the deterioration of inner tubes, tires, thread, hose, dipped goods, mechanical goods, latex or articles made from latex, etc.

With the detailed disclosure above given, it will be obvious that modifications will suggest themselves and it is not desired to limit the invention otherwise than as set forth in the appended claims.

Having thus described my invention, what I claim and desire to protect by Letters Patent is:

1. A method of retarding the deterioration of rubber which comprises treating rubber with a compound having the general formula

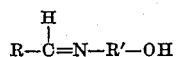

in which R is an aromatic radical and R′ = an arylene radical.

2. A method of retarding the deterioration of rubber which comprises treating rubber with a compound having the general formula

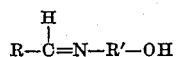

in which R is an aromatic radical and R′ = an arylene radical, and subsequently vulcanizing the rubber.

3. A method of retarding the deterioration of rubber which comprises treating rubber with a compound having the general formula

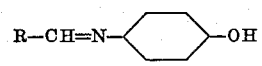

in which R is an aromatic radical.

4. A method of retarding the deterioration of rubber which comprises treating rubber with a vulcanizing agent, a metallic oxide, a compound having the general formula

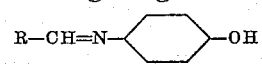

in which R is an aromatic radical.

5. A method of retarding the deterioration of rubber which comprises treating rubber with a compound having the general formula

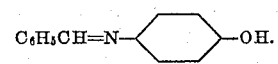

6. A method of retarding the deterioration of rubber which comprises treating rubber with sulphur, zinc oxide, a compound having the general formula

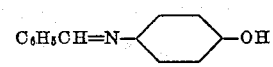

and subsequently vulcanizing the rubber.

7. A rubber product obtained according to the process set forth in claim 1.

8. A vulcanized rubber product obtained according to the process set forth in claim 2.

9. A rubber product obtained according to the process set forth in claim 3.

10. A vulcanized rubber product obtained according to the process set forth in claim 4.

11. A rubber product obtained according to the process set forth in claim 5.

12. A vulcanized rubber product obtained according to the process set forth in claim 6.

Signed at Passaic, county of Passaic, State of New Jersey, this 28th day of February, 1930.

LOUIS H. HOWLAND.